United States Patent
Jaouen et al.

(10) Patent No.: US 7,038,285 B2
(45) Date of Patent: *May 2, 2006

(54) VERY HIGH SENSITIVITY MAGNETIC SENSOR

(75) Inventors: Hervé Jaouen, Meylan (FR); Thomas Skotnicki, Crolles-Montfort (FR); Malgorzata Jurczak, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 287 days.

This patent is subject to a terminal disclaimer.

(21) Appl. No.: 10/149,093

(22) PCT Filed: Dec. 6, 2000

(86) PCT No.: PCT/FR00/03407

§ 371 (c)(1),
(2), (4) Date: Sep. 5, 2002

(87) PCT Pub. No.: WO01/42805

PCT Pub. Date: Jun. 14, 2001

(65) Prior Publication Data

US 2003/0076095 A1 Apr. 24, 2003

(30) Foreign Application Priority Data

Dec. 7, 1999 (FR) .................................... 99 15410

(51) Int. Cl.
*H01L 29/82* (2006.01)

(52) U.S. Cl. ................ 257/421; 257/416; 257/415; 257/417; 257/418; 257/419; 257/420; 324/252; 324/247; 324/259; 324/269

(58) Field of Classification Search ............... 252/421, 252/415, 416, 417, 418, 419, 420; 324/252, 324/241, 249, 269; 257/410, 411, 412, 413, 257/417, 416, 418, 419, 619, 623
See application file for complete search history.

(56) References Cited

U.S. PATENT DOCUMENTS 4,912,990 A * 4/1990 Norling .................... 73/862.59
5,578,843 A * 11/1996 Garabedian et al. ......... 257/254
6,670,686 B1 * 12/2003 Jaouen et al. ............... 257/416

FOREIGN PATENT DOCUMENTS

EP 0305978 * 3/1989
WO 99/46610 * 9/1999

* cited by examiner

*Primary Examiner*—Nathan J. Flynn
*Assistant Examiner*—Fazli Erdem
(74) *Attorney, Agent, or Firm*—Lisa K. Jorgenson; Allen, Dyer, Doppelt, Milbrath & Gilchrist, P.A.

(57) ABSTRACT

A magnetic sensor includes a thin deformable membrane made of a conductive material forming a first plate of a capacitor which conducts an electric current therethrough. A second capacitor plate of the capacitor includes a doped region of a semiconductor substrate. A layer of a gaseous dielectric separates the two plates. The membrane deforms due to the effect of the Lorentz force generated by a magnetic field lying in the plane of the membrane and perpendicular to the lines of current being conducted therethrough. In addition, a process for fabricating this magnetic sensor is also provided as well as a device for measuring a magnetic field using the magnetic sensor.

18 Claims, 6 Drawing Sheets

VERY HIGH SENSITIVITY MAGNETIC SENSOR

FIELD OF THE INVENTION

The present invention relates to the field of microelectronics, and, more particularly, to a magnetic sensor and to a process for fabricating the same, and to a device for measuring a magnetic field using the magnetic sensor.

BACKGROUND OF THE INVENTION

Silicon-based magnetic sensors generally use the asymmetry induced by the magnetic field based upon the Hall effect. This is because, after a magnetic field has been applied, an electric field is created perpendicular to the electric current causing a shift in the lines of current. A potential difference then occurs that can be measured, and this difference is proportional to the magnetic field and to the electric current.

In the microelectronics field, the trend towards components of increasingly small dimensions means an undesirable reduction in the sensitivity of sensors of this type. To overcome this drawback, it is either necessary to use a low operating temperature or a material having a high electron mobility. The use of a low temperature makes it more difficult to use sensors, and increases the complexity and cost of the magnetic-field measurement devices. Furthermore, silicon, which is a material of choice in microelectronics, has a relatively low electron mobility (1500 cm$^2$/Vs at room temperature), which impedes its use in Hall-effect sensors.

SUMMARY OF THE INVENTION

In view of the foregoing background, it is therefore an object of the present invention to remedy the drawbacks of the prior art by producing a magnetic sensor not based on the Hall effect but on the effect of the Lorentz force.

This and other objects, features and advantages in accordance with the present invention are provided by a magnetic sensor comprising an electrically conductive deformable membrane, and a process for fabricating this magnetic sensor. The present invention also relates to a device for measuring the magnetic field.

More particularly, the magnetic sensor comprises an electrically conductive deformable membrane forming a first plate of a capacitor and is subjected to an electric current generating lines of current in the deformable membrane. The deformable membrane is preferably made of single-crystal silicon. The membrane deforms under the effect of the Lorentz force generated by a magnetic field lying in the plane of the membrane and perpendicular to the lines of current. A second capacitor plate comprises a doped region of a semiconductor substrate, and a layer of a gaseous dielectric separates the two plates.

The membrane has a thickness which varies from 5 to 100 nm, and preferably from 10 to 20 nm. Furthermore, the semiconductor substrate is preferably made of silicon and the gaseous dielectric is preferably chosen from air and nitrogen, and, most particularly, air.

The magnetic sensor of the present invention may be fabricated according to the following process comprising providing a substrate made of a semiconductor material, preferably silicon, depositing an epitaxial layer of Ge or SiGe alloy on a main surface of the substrate, and depositing a thin layer of an electrically conductive material, preferably silicon, on the epitaxial layer of Ge or SiGe alloy.

The process preferably further comprises etching, by using a mask, two lateral trenches in the thin upper layer of the electrically conductive material, the epitaxial layer of Ge or SiGe alloy, and part of the substrate to define a central stack including part of the thin layer of electrically conductive material, part of the epitaxial layer of Ge or SiGe alloy and part of the substrate, and exposing on two opposed lateral sides of the stack part of the epitaxial layer of Ge or SiGe alloy.

The exposed epitaxial layer of Ge or SiGe alloy is preferably selectively removed, laterally, so as to form a cavity bounded by the substrate and the upper layer of the electrically conductive material of the stack. The upper layer of the electrically conductive material forms a thin membrane. Lateral spacers are formed to close the cavity beneath the membrane.

The process preferably further includes doping the membrane with a dopant having a first type of conductivity to form a first plate of a capacitor, and doping that part of the substrate which lies beneath the membrane with a dopant of the first type of conductivity to form a second plate of the capacitor. The substrate lying at the bottom of the trenches is also preferably doped with a dopant of a second type of conductivity of the opposite type to the first so as to isolate the second plate of the capacitor.

The term "SiGe alloy" should be understood in the present invention to mean compounds satisfying the following formula:

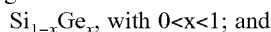
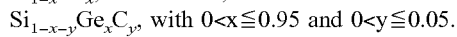

$Si_{1-x}Ge_x$, with $0<x<1$; and
$Si_{1-x-y}Ge_xC_y$, with $0<x\leq0.95$ and $0<y\leq0.05$.

Preferably, the SiGe alloy has a high germanium content, and in particular, has a weight of germanium from 10 to 30%.

The lateral selective etching of the Ge or of the SiGe alloy may be carried out using one of the techniques well known to those skilled in the art, such as isotropic plasma etching, and etching by a chemical oxidizing solution. This solution, for example, preferably comprises 40 ml of 50% HNO$_3$, 20 ml of H$_2$O$_2$ and 5 ml of 0.5% HF.

This process may furthermore include the conventional formation of a silicon oxide layer and the selective etching of this layer for the purpose of producing interconnects. Prior to the deposition and to the etching of the SiO$_2$ layer, an additional step may be carried out which includes depositing an etch stop layer made of Si$_3$N$_4$. This layer, which generally has a thickness of approximately 40 nm, allows the subsequent etching of the structure formed by the process according to the invention to be precisely stopped without any risk of etching the underlying layers.

The electric current conducting through the membrane of the sensor may be modulated and correlated with the frequency associated with the magnetic field. This makes it possible to improve sensitivity to the magnetic field. The electric current I flowing in the membrane generates a force normal to the surface which will deform the membrane due to the effect of the magnetic induction B.

By measuring the capacitance C between the membrane and the substrate, this deformation can be measured. This measurement is preferably carried out in a differential mode to improve the noise immunity using two structures side by side which conduct the flow of current in opposite directions. This will be carried out either by a synchronous detection method by modulating the current I and by calculating the correlation function between I and C, or by a direct measurement of the frequency of an oscillator. The frequency of the oscillator depends on the value of the capacitance thus produced.

The present invention also relates to a device for measuring the magnetic field. The device preferably comprises an oscillating circuit and at least one magnetic sensor connected thereto as defined above. Furthermore, the magnetic sensor according to the present invention may be used with the same principle as a pressure sensor if no current is applied to the membrane.

BRIEF DESCRIPTION OF THE DRAWINGS

Further characteristics, features and advantages of the invention will become even more apparent on reading the description, on examining the appended drawings and the various examples which follow.

DETAILED DESCRIPTION OF THE PREFERRED EMBODIMENTS

Figure 1A:
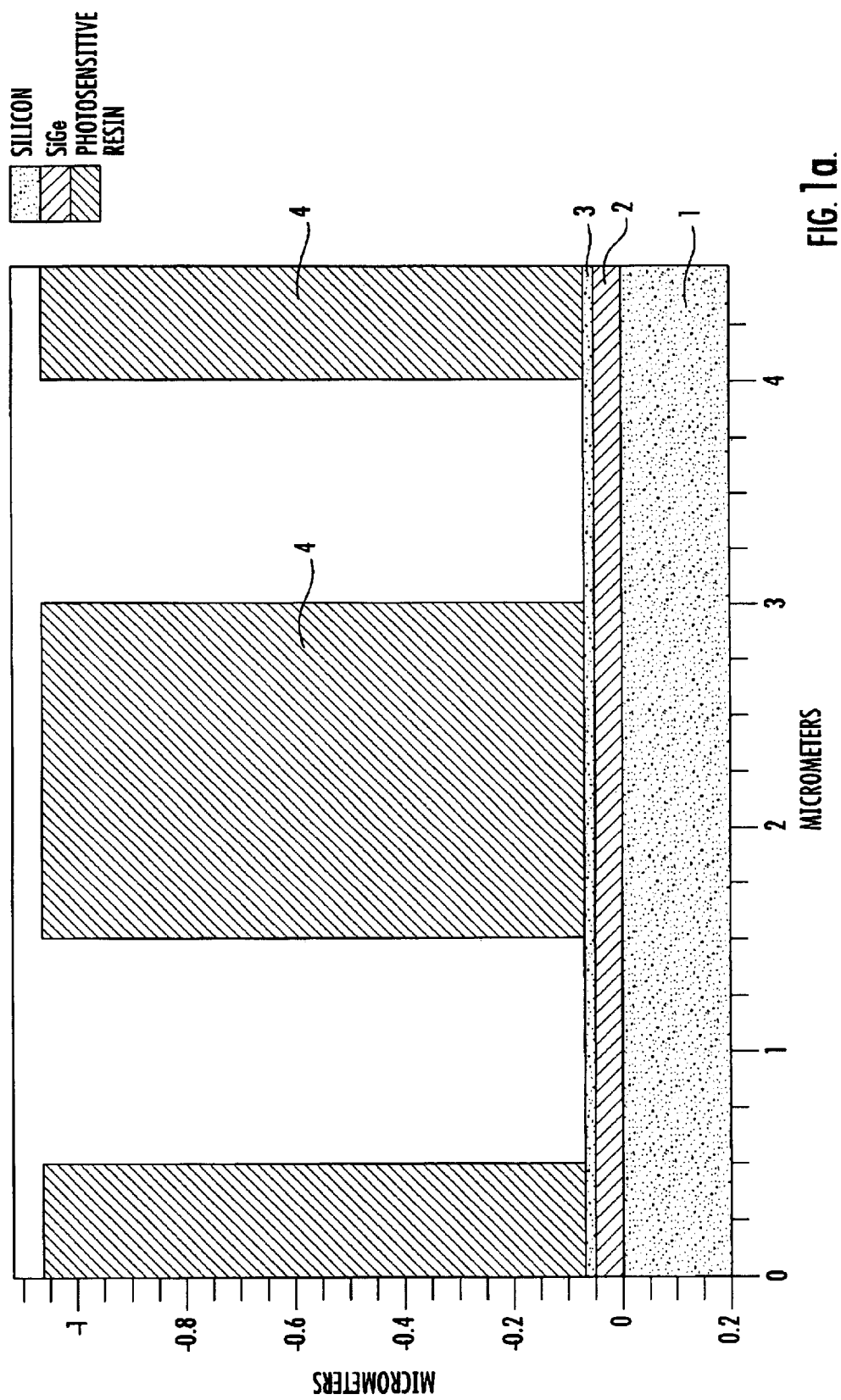
FIGS. 1A to 1D show the main steps for fabricating a sensor according to the present invention.

As shown in FIG. 1a, the process starts by forming on a silicon substrate 1 an SiGe layer 2 and a thin layer of electrically conductive material 3 such as silicon, for example, and then a photoresistive resin mask 4. The SiGe layer 2 and the silicon layer 3 may be formed on the substrate 1 by epitaxy.

Figure 1B:
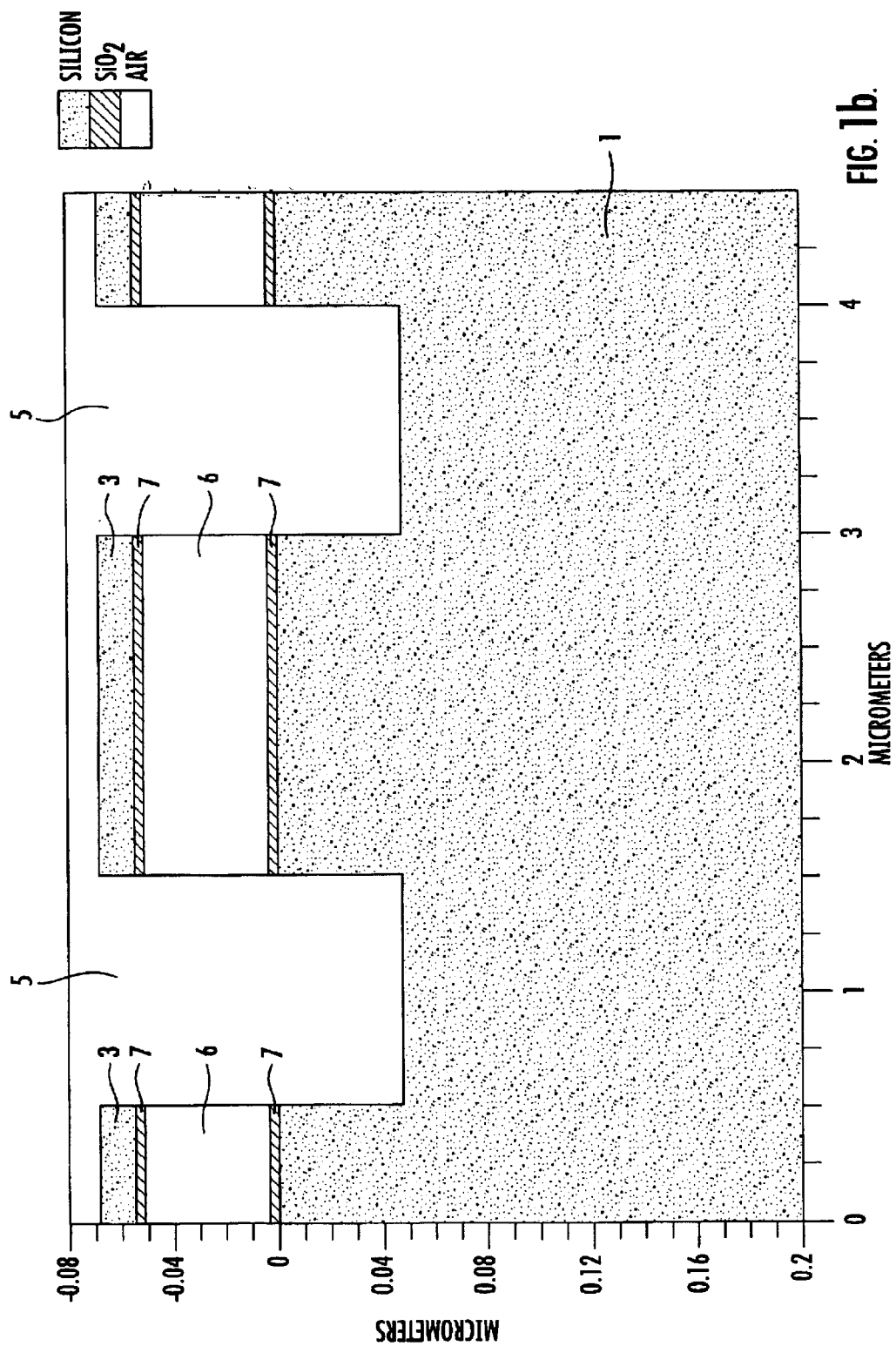

As shown in FIG. 1b, lateral trenches 5 are etched in the thin Si layer 3, the SiGe layer 2 and part of the substrate 1 using a mask. Thus, the trenches 5, which define mesa-type stacks, reveal the SiGe layer on two lateral sides of the stack. The SiGe layer is then removed from the stacks to form cavities 6. The upper wall of which include the remaining part of the thin upper layer 3 of Si which will subsequently form the membrane of the sensor. Finally, the resin mask is removed. It is also possible to form, on the internal walls of the cavity, thin layers 7 of a dielectric material, for example $SiO_2$, to serve as a protective barrier.

Figure 1C:
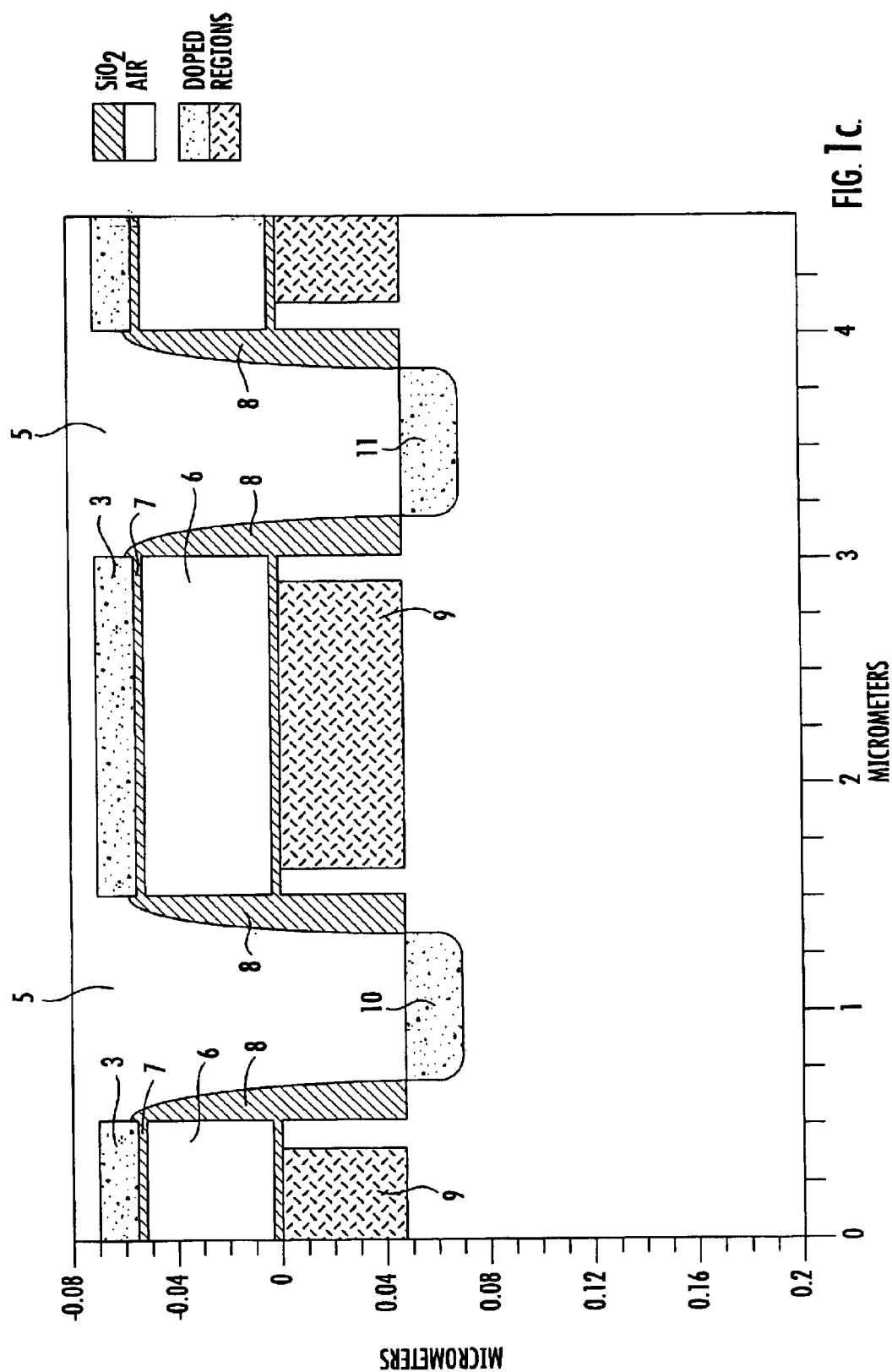

As shown in FIG. 1c, spacers 8 made of dielectric material, for example $SiO_2$, are formed conventionally on each side of the mesa-type stack to close off the cavity 6 beneath the membrane 3. The process then continues with conventional dopant implantation in the various regions of the structure. Thus, a dopant of a first type of conductivity is implanted in the membrane and the substrate part of the mesa-type stack. The silicon membrane 3 thus forms a first plate of a capacitor. The doped part of the substrate of the mesa-type stack, which is a channel region 9 of a semiconductor device, forms a second plate of the capacitor.

Figure 1D:
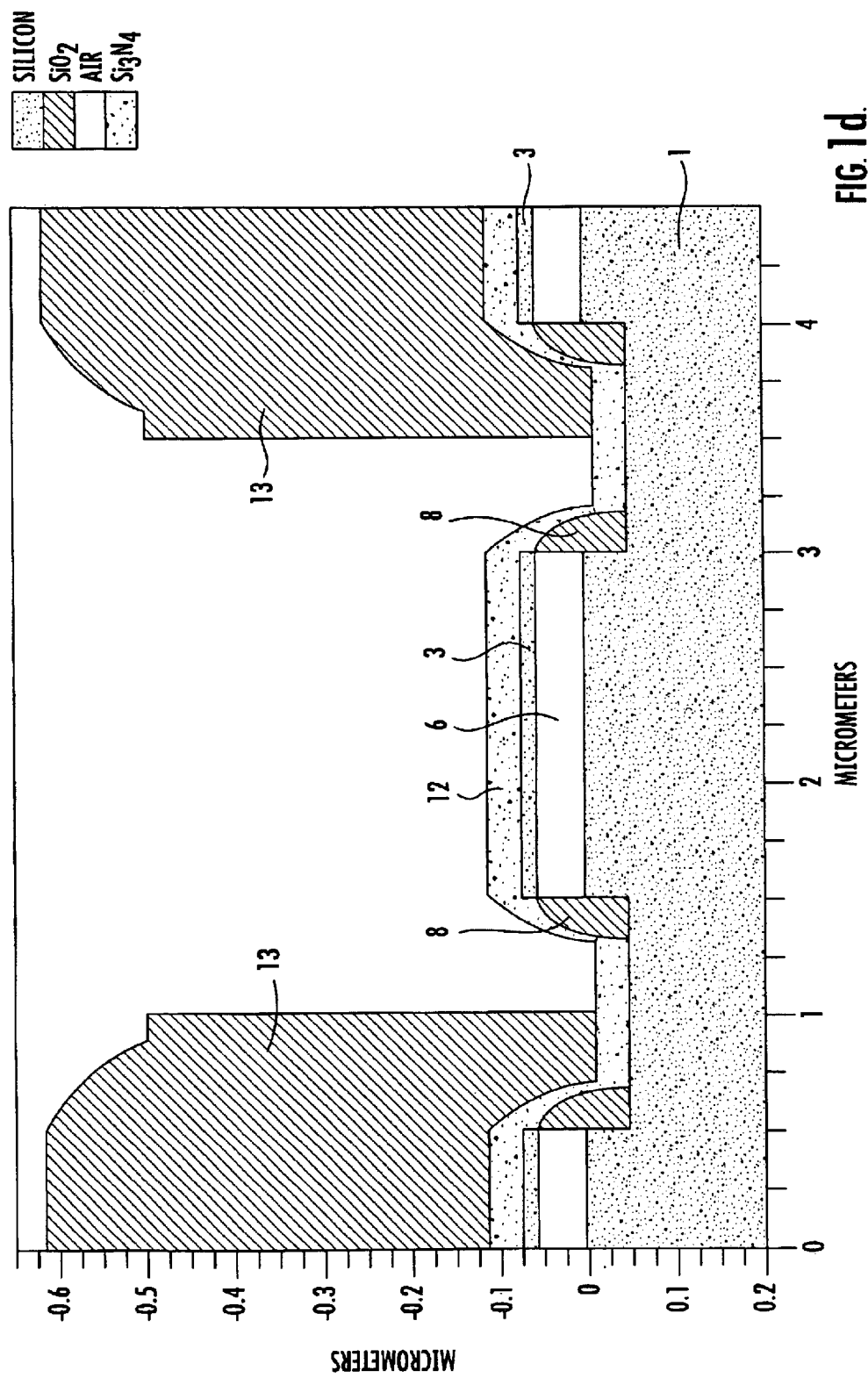

The substrate at the bottom of the trenches 5 is then doped with a dopant of a second type of conductivity, of opposite type to the first, in order to form source and drain regions 10 and 11 which electrically isolate the channel region 9, and therefore, the second plate of the capacitive structure. As shown in FIG. 1d, an $Si_3N_4$ layer 12 and an $SiO_2$ layer 13 are formed in succession. Then the $SiO_2$ layer is conventionally etched using a mask. The $Si_3N_4$ layer 12 serves as the etch stop layer.

Figure 2:
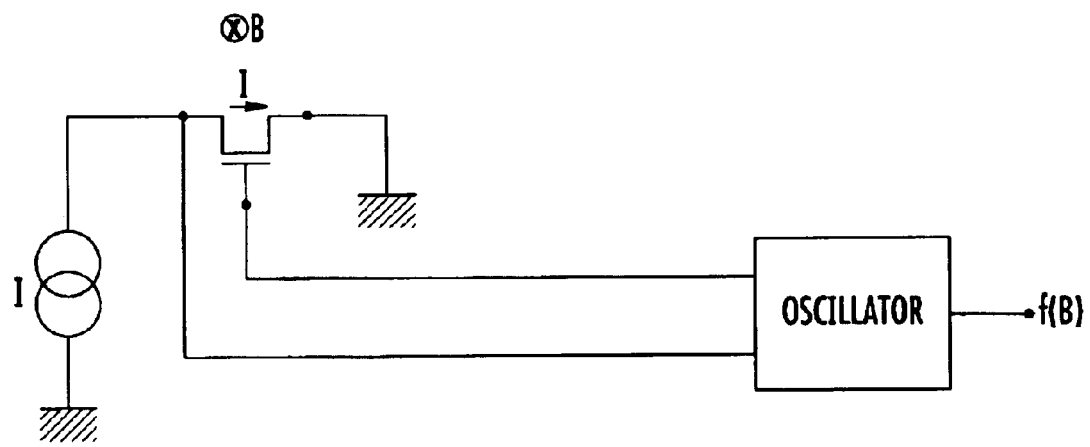
FIG. 2 shows a device comprising a magnetic sensor according to the present invention.
Figure 3:
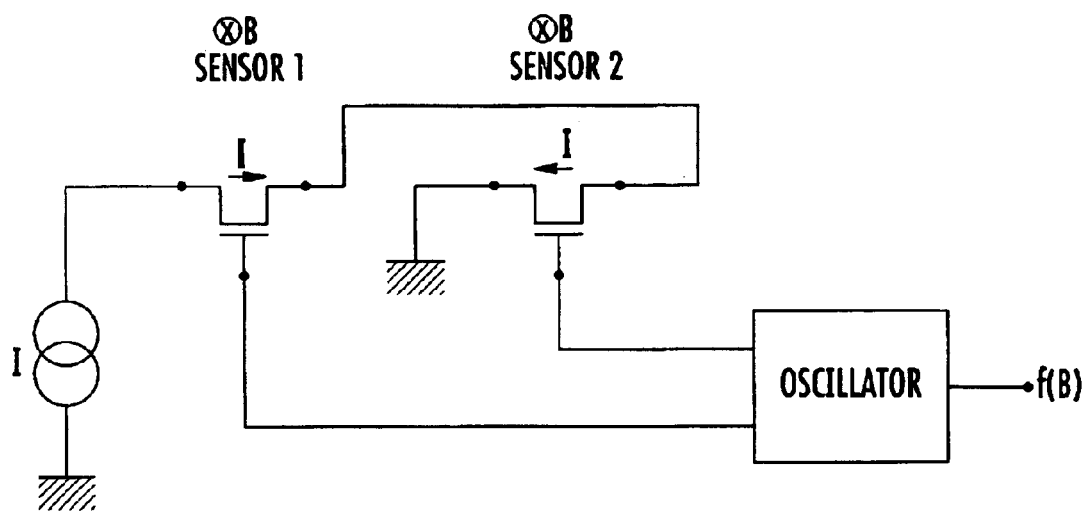
FIG. 3 shows a device comprising two magnetic sensors according to the present invention.
Figure 4:
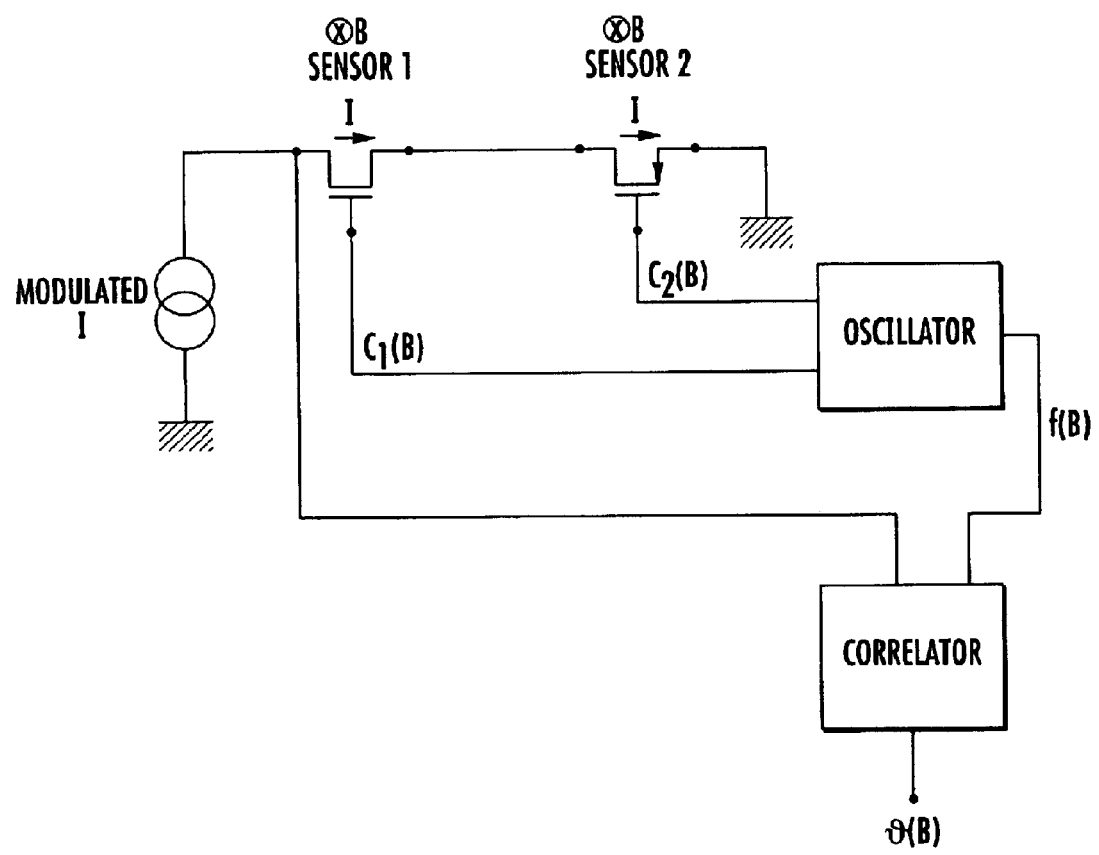
FIG. 4 shows a device comprising two magnetic sensors and a correlator according to the present invention.

This magnetic sensor can then be used in a device according to the invention. Three examples of devices are illustrated in FIGS. 2 to 4. As shown in FIG. 2, an electric current generator is connected to the membrane of the sensor forming a first plate of a capacitor. The channel region of the sensor forms the second plate of the capacitor, and is connected to an oscillator. The electric current I produced by the generator flows through the membrane as indicated in the figure, for example.

When this sensor is placed in a magnetic field so that the field is perpendicular to the lines of current and lies in the plane of the membrane, as indicated in FIG. 2, for example, the membrane deforms due to the effect of the Lorentz force created and the capacitance of the capacitor varies. This also makes the frequency of the oscillator vary. The measurement of the frequency of the oscillator is therefore representative, for a constant current I, of the value of the magnetic field applied.

Moreover, to improve the noise immunity, this measurement may be carried out in a differential mode using two sensors according to the present invention (sensor 1 and sensor 2) that are placed side by side, as shown in FIG. 3. These two sensors are mounted so that their membranes allow current of the same intensity to conduct, but in opposite directions. Thus, the capacitance variations associated with the magnetic field are added while those associated with the pressure variations are subtracted. Consequently, the frequency of the oscillator depends on the variation in the value of the capacitance due to the magnetic field, independently of the variations in the pressure of the atmosphere surrounding the sensors.

As shown in FIG. 4, the electric current coursing or being conducted through the membrane of the sensor may be modulated and correlated with the frequency associated with the magnetic field. The current generator is connected to the membrane of the sensor 1, and this membrane is connected to the membrane of the sensor 2 which is grounded. The channel regions of the sensors 1 and 2 forming the second plates of the capacitors are connected to an oscillator.

In this construction, the modulated current I flows in the same direction in each of the membranes of the sensors 1 and 2. The output current of the generator forms one of the input signals of a correlator, such as a multiplier followed by a low-pass filter, for example. A second input signal is formed by the output signal of the oscillator. The correlator therefore delivers a signal representative of the variations in the magnetic field correlated with the modulated current. In this way, the sensitivity of the magnetic sensor produced is increased.

That which is claimed is:

1. A magnetic sensor comprising:
   a semiconductor substrate comprising a doped region defining a lower electrode of a capacitor;
   a deformable membrane overlying said lower electrode and comprising a conductive material defining an upper electrode of the capacitor, said deformable membrane generating lines of current therein when conducting a current and deforming based upon a Lorentz force generated by a magnetic field lying in a plane of said deformable membrane which is perpendicular to the lines of current; and
   a layer of a gaseous dielectric separating said deformable membrane and said lower electrode.

2. A magnetic sensor according to claim 1, wherein said deformable membrane comprises silicon.

3. A magnetic sensor according to claim 1, wherein said deformable membrane has a thickness in a range of about 5 to 100 nm.

4. A magnetic sensor according to claim 3, wherein said deformable membrane has a thickness in a range of about 10 to 20 nm.

5. A magnetic sensor according to claim 1, wherein said semiconductor substrate comprises silicon.

6. A magnetic sensor according to claim 1, wherein said layer of a gaseous dielectric comprises at least one of air and nitrogen.

7. A magnetic sensor comprising:

a semiconductor substrate and a lower electrode of a capacitor associated with said semiconductor substrate; and a deformable membrane overlying and in spaced relation from said lower electrode and comprising a conductive material defining an upper electrode of the capacitor, said deformable membrane deforming based upon a Lorentz force generated by a combined magnetic and electric field resulting from a current being conducted through the deformable membrane.

8. A magnetic sensor according to claim 7, further comprising a layer of a gaseous dielectric separating said deformable membrane and said lower electrode.

9. A magnetic sensor according to claim 7, wherein said deformable membrane has a thickness in a range of about 5 to 100 nm.

10. A magnetic sensor according to claim 9, wherein said deformable membrane has a thickness in a range of about 10 to 20 nm.

11. A magnetic sensor according to claim 7, wherein said layer of a gaseous dielectric comprises at least one of air and nitrogen.

12. A device for measuring a magnetic field comprising:

a current source providing a current;

an oscillator circuit; and at least one magnetic sensor connected between said current source and said oscillator circuit, said magnetic sensor comprising a semiconductor substrate and a lower electrode of a capacitor associated with said semiconductor substrate, said lower electrode being connected to said oscillator circuit, and a deformable membrane overlying and in spaced relation from said lower electrode and being connected to said current source, said deformable membrane comprising a conductive material defining an upper electrode of the capacitor, said deformable membrane deforming based upon a Lorentz force generated by a combined magnetic and electric field resulting from a current being conducted through the deformable membrane.

13. A device according to claim 12, further comprising a layer of a gaseous dielectric separating said deformable membrane and said lower electrode.

14. A device according to claim 12, wherein the current from said current source is modulated and correlated with a frequency associated with the magnetic field.

15. A device according to claim 12, wherein the at least one magnetic sensor comprises two magnetic sensors conducting the respective current therethrough in opposing directions.

16. A device according to claim 12, wherein said deformable membrane has a thickness in a range of about 5 to 100 nm.

17. A device according to claim 16, wherein said deformable membrane has a thickness in a range of about 10 to 20 nm.

18. A device according to claim 12, wherein said layer of a gaseous dielectric comprises at least one of air and nitrogen.

\* \* \* \* \*